United States Patent
Lazzarin et al.

(10) Patent No.: US 9,243,721 B2
(45) Date of Patent: Jan. 26, 2016

(54) METHOD AND SYSTEM FOR SECURING A PIPELINE TO THE BED OF A BODY OF WATER

(71) Applicant: SAIPEM S.p.A., San Donato Milanese (IT)

(72) Inventors: Diego Lazzarin, Treviso (IT); Paolo Dallona, Spinea (IT); Diego Magri, Spinea (IT)

(73) Assignee: SAIPEM S.p.A., San Donato Milanese (IT)

( * ) Notice: Subject to any disclaimer, the term of this patent is extended or adjusted under 35 U.S.C. 154(b) by 0 days.

(21) Appl. No.: 14/347,513

(22) PCT Filed: Sep. 28, 2012

(86) PCT No.: PCT/IB2012/055214
§ 371 (c)(1),
(2) Date: Mar. 26, 2014

(87) PCT Pub. No.: WO2013/046184
PCT Pub. Date: Apr. 4, 2013

(65) Prior Publication Data
US 2014/0286709 A1 Sep. 25, 2014

(30) Foreign Application Priority Data
Sep. 30, 2011 (IT) .............................. MI2011A1779

(51) Int. Cl.
*F16L 1/16* (2006.01)
*F16L 1/20* (2006.01)
*F16L 1/26* (2006.01)

(52) U.S. Cl.
CPC ..... *F16L 1/16* (2013.01); *F16L 1/20* (2013.01); *F16L 1/201* (2013.01); *F16L 1/265* (2013.01)

(58) Field of Classification Search
CPC ............... F16L 1/065; F16L 1/16; F16L 1/20; F16L 1/201; F16L 1/265
See application file for complete search history.

(56) References Cited

U.S. PATENT DOCUMENTS

| 3,427,812 A | 2/1969 | Hollander |
| 3,479,830 A | 11/1969 | Ostarly |
| 3,765,184 A | 10/1973 | Menard |
| 3,841,105 A | 10/1974 | Cannon |

(Continued)

FOREIGN PATENT DOCUMENTS

| FR | 2439926 A1 * | 5/1980 |
| NL | 8 202 199 | 12/1983 |

OTHER PUBLICATIONS

International Search Report and Written Opinion for International Application No. PCT/IB2012/055214 dated Dec. 3, 2012.

(Continued)

*Primary Examiner* — Benjamin Fiorello
(74) *Attorney, Agent, or Firm* — Neal, Gerber & Eisenberg LLP (57) ABSTRACT

A method of securing a pipeline to the bed of a body of water includes moving an underwater vehicle selectively, on the bed of the body of water, along the pipeline; transporting a plurality of fastening devices on the underwater vehicle; and driving each fastening device partly into the bed of the body of water, close to the pipeline, by a handling device mounted on the underwater vehicle, to confine the pipeline between the bed of the body of water and the fastening device.

24 Claims, 5 Drawing Sheets

(56) References Cited

U.S. PATENT DOCUMENTS 3,851,492 A    12/1974  Cannon et al.
3,903,704 A     9/1975  Spiridonov
4,338,045 A     7/1982  Cour
5,730,552 A     3/1998  Johannesson et al.

OTHER PUBLICATIONS

Notification Concerning Submission, Obtention or Transmittal of Priority Document (Form PCT/IB/304) for International Application No. PCT/IB2012/055214 dated Nov. 28, 2012.
Response to International Search Report and the associated Written Opinion for International Application No. PCT/IB2012/055214 dated Jul. 29, 2013.
PCT Demand (Form PCT/IPEA/401) for International Application No. PCT/IB2012/055214.
Notification of Receipt of Demand by Competent International Preliminary Examining Authority (Form PCT/IPEA/402) for International Application No. PCT/IB2012/055214 dated Aug. 13, 2013.
Notification Concerning Informal Communications with the Applicant (Form PCT/IPEA/429) for International Application No. PCT/IB2012/055214 dated Sep. 13, 2013.
Second Response to International Search Report and the associated Written Opinion for International Application No. PCT/IB2012/055214 dated Nov. 11, 2013.
Notification of Transmittal of the International Preliminary Report on Patentability (Form PCT/IPEA/416) for International Application No. PCT/IB2012/055214 dated Dec. 2, 2013.
International Preliminary Report on Patentability (Form PCT/IPEA/409) for International Application No. PCT/IB2012/055214 dated Dec. 2, 2013.

* cited by examiner

METHOD AND SYSTEM FOR SECURING A PIPELINE TO THE BED OF A BODY OF WATER

PRIORITY CLAIM

This application is a national stage application of PCT/IB2012/055214, filed on Sep. 28, 2012, which claims the benefit of and priority to Italian Patent Application No. MI2011A 001779, filed on Sep. 30, 2011, the entire contents of which are each incorporated by reference herein.

BACKGROUND

Pipelines on the bed of a body of water are normally secured to prevent them from moving with respect to the bed as a result, for example, of storms or of fluid flowing along the pipeline at a different temperature from the surrounding water. Any movement may cause severe stress or even failure of the pipeline itself.

Methods proposed to prevent or at least reduce movement of pipelines with respect to the bed include:
  coating the pipeline with concrete or Gunite to weight the pipeline down;
  placing rocks on top of and alongside the pipeline (rock damping);
  applying ballast to the pipeline;
  laying and possibly burying the pipeline in a trench; and
  securing the pipeline to the bed with fasteners.

The latter method is preferably used on rocky beds and, for this reason, is known as 'rock bolting'.

Pipeline rock bolting methods are described in: U.S. Pat. Nos. 3,903,704 A; 4,338,045; 5,730,552; 3,427,812; and 3,841,105.

Known methods in general have various drawbacks, including: the need to employ divers; and the difficulty and time-consuming work involved in positioning the fasteners correctly with respect to the pipeline.

SUMMARY

The present disclosure relates to a method of securing a pipeline to the bed of a body of water.

It is an advantage of the present disclosure to provide a method of securing a pipeline to the bed of a body of water, configured to minimize certain of the drawbacks of certain of the known art.

According to the present disclosure, there is provided a method of securing a pipeline to the bed of a body of water, the method comprising the steps of moving an underwater vehicle selectively, on the bed of the body of water, along the pipeline; setting a module storing a plurality of fastening devices in a predetermined position on the underwater vehicle configured to support the module; transporting a plurality of fastening devices on the underwater vehicle; and driving each fastening device partly into the bed of the body of water, close to the pipeline, by use of a handling device mounted on the underwater vehicle, to confine the pipeline between the bed of the body of water and the fastening device, wherein the fastening device is substantially inverted-U-shaped, so as to secure the pipeline between the bed of the body of water and the fastening device and comprises at least one pole, and a saddle connected to the pole; the step of driving the fastening device into the bed of the body of water comprising the steps of digging into the bed of the body of water using one end of the pole, and simultaneously driving the pole into the bed of the body of water using the handling device.

The time taken to drive in the fastening devices is reduced, in particular by carrying the fasteners on board the underwater vehicle, and driving them in automatically from the underwater vehicle.

Once driven into the bed of the body of water, the fastening device forms a bridge about, and confining the movement of, the pipeline.

The pole of the fastening device acts as a digging tool to drive the pole more easily into cohesive; compacted beds.

More specifically, the method comprises rotating at least the bottom end of the pole by the handling device.

The handling device mounted on the underwater vehicle is advantageously configured to drive in the pole.

In one embodiment, the pole is driven in by the handling device imparting a reciprocating movement to the pole, along the longitudinal axis of the pole, to hammer into the bed of the body of water.

It is sometimes necessary to ram the bed of the body of water with the end of the pole to break up particularly cohesive, compacted material and drive in the fastening device faster.

In one embodiment of the disclosure, the method comprises positioning the fastening device astride the pipeline by the handling device, and sensors mounted on the underwater vehicle.

This greatly simplifies positioning the fastening device in the correct drive-in position.

In one embodiment, the method comprises extracting each fastening device from the module and positioning the fastening device over the pipeline by the handling device.

The handling device is advantageously configured to extract the fastening devices from the module and set them into the drive-in position automatically.

In one embodiment, the method comprises removing each fastening device from the module by grippers on the handling device, and transferring the fastening device to driving members on the handling device.

In one embodiment, the method comprises remote-controlling the underwater vehicle, such as from a floating support unit of the underwater vehicle.

A further advantage of the present disclosure is to provide a system configured to secure a pipeline to the bed of a body of water, configured to eliminate or at least greatly reduce certain of the drawbacks of certain of the known art.

According to the present disclosure, there is provided a system configured to secure a pipeline to the bed of a body of water, the system comprising an underwater vehicle configured to move in steps, on the bed of the body of water, along the pipeline and comprising at least one module configured to store a plurality of fastening devices; a supporting frame with a predefined area configured to support at least one module; a plurality of fastening devices transported by the underwater vehicle; and a handling device mounted on the underwater vehicle to drive each fastening device partly into the bed of the body of water, close to the pipeline, to confine the pipeline between the bed of the body of water and the fastening device, wherein the fastening device is inverted-U-shaped, so as to secure the pipeline between the bed of the body of water and the fastening device, and comprises at least one pole, and a saddle connected to the pole; the handling device comprising at least one driving member configured to rotate at least the bottom end of the pole to dig into the bed of the body of water.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
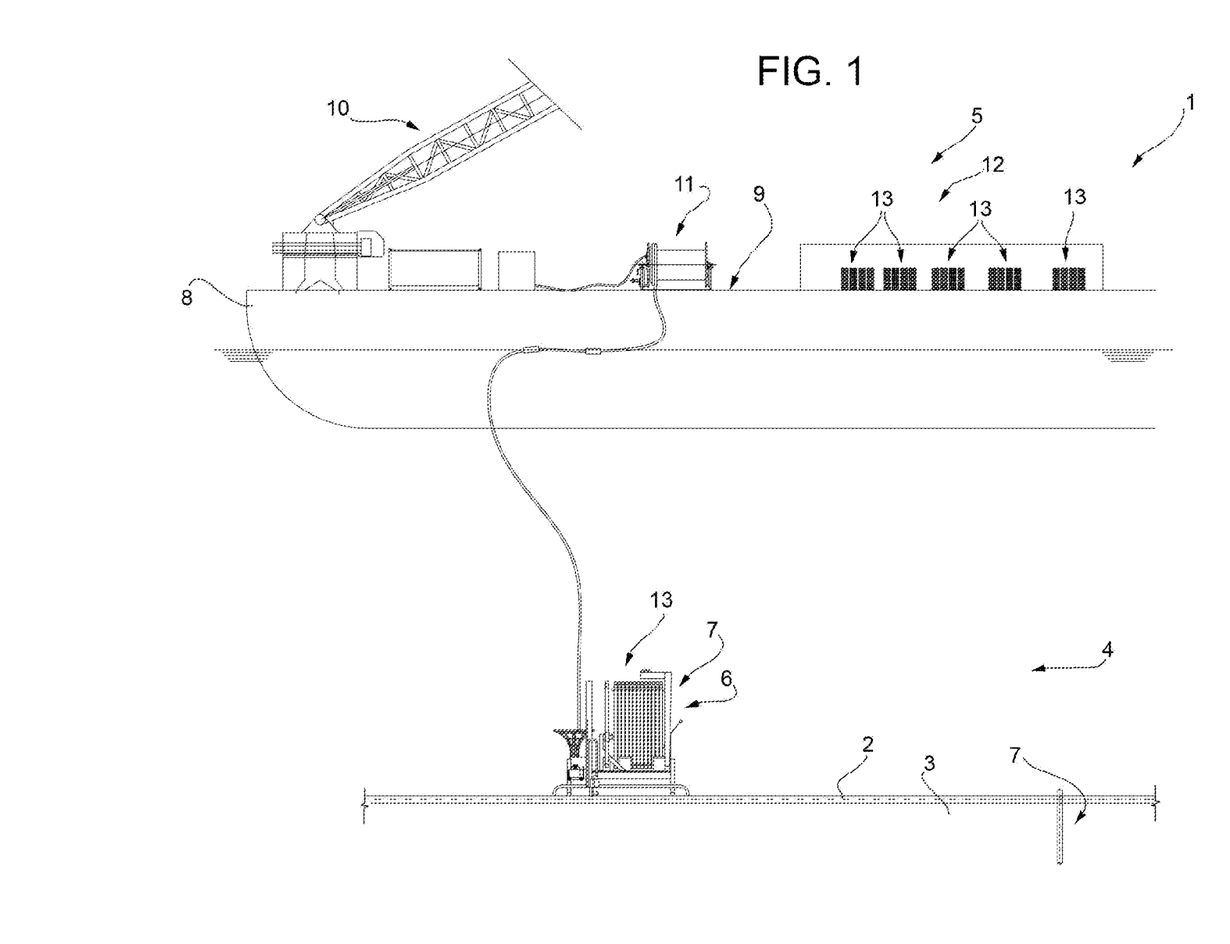
FIG. 1 shows a side view, with parts removed for clarity, of a system configured to secure a pipeline to the bed of a body of water in accordance with the present disclosure.
Figure 2:
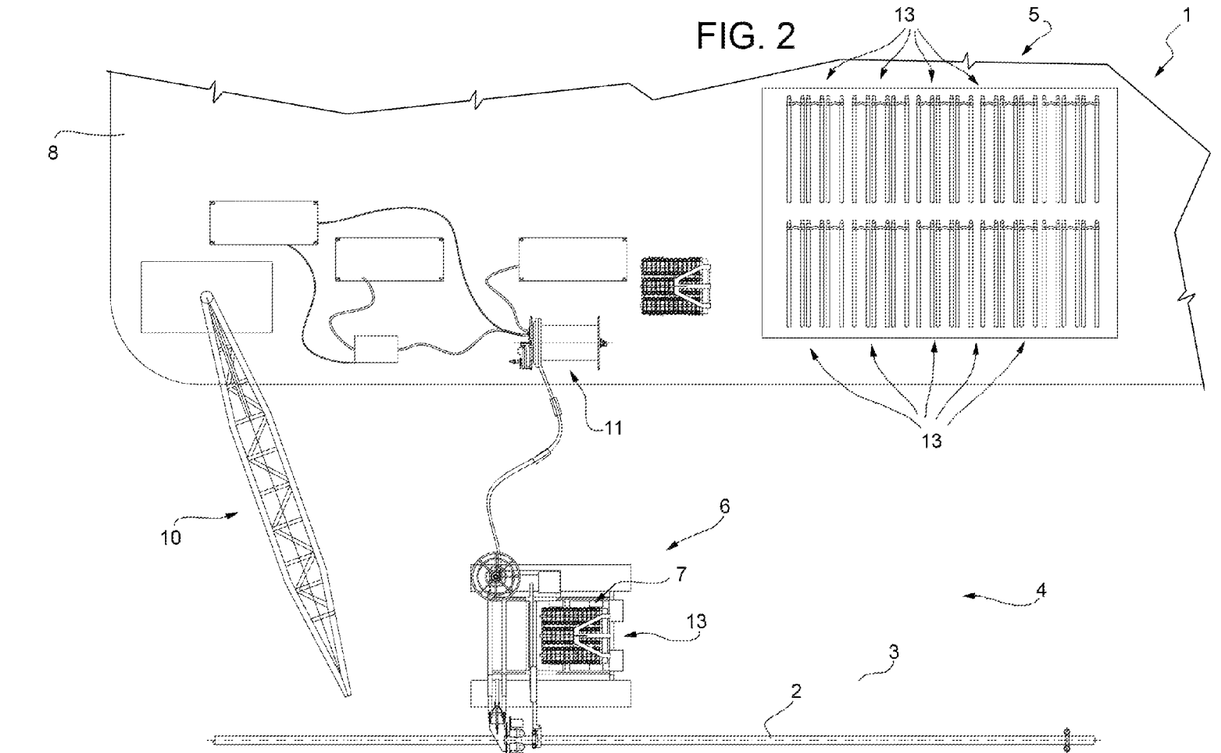
FIG. 2 shows a plan view, with parts removed for clarity, of the FIG. 1 system.

Referring now to the example embodiments of the present disclosure illustrated in FIGS. 1 to 5, number 1 in FIGS. 1 and 2 indicates as a whole a system configured to secure a pipeline 2 to the bed 3 of a body of water 4.

System 1 comprises a floating unit 5, an underwater vehicle 6, and a plurality of fastening devices 7. Floating unit 5 is configured to assist underwater vehicle 6 and, in one embodiment shown of the disclosure, is configured to power underwater vehicle 6, transporting large quantities or numbers of fastening devices, and recovering underwater vehicle 6 once the pipeline is secured. And underwater vehicle 6 is configured to distribute fastening devices 7 along pipeline 2, positioning fastening devices 7 astride pipeline 2, and securing fastening devices 7 integrally with bed 3 of body of water 4 to secure pipeline 2 in a designated or given position with respect to bed 3.

In the example shown in FIGS. 1 and 2, floating unit 5 comprises a floating structure 8; a weather deck 9; a crane 10; a umbilical power feed system 11 to underwater vehicle 6; and a fastening device storage area 12. In certain embodiments, fastening devices 7 are stored using modules 13, each of which holds a plurality of neatly arranged fastening devices 7, is engaged and transferred by crane 10 between floating unit 5 and underwater vehicle 6, and is positioned selectively on underwater vehicle 6.

With reference to FIG. 2, underwater vehicle 6 is configured to rest on bed 3 of body of water. Underwater vehicle 6 is configured to move along bed 3 of body of water 4. Underwater vehicle 6, in the example shown, is a crawler vehicle configured to move along pipeline 2 laid on bed 3. In certain embodiments, underwater vehicle 6 moves in steps and, when stopped, positions a fastening device 7 astride pipeline 2 and secures the fastening device to bed 3. Fastening devices 7 may be equally or variably spaced along the pipeline. And as underwater vehicle 6 moves forward, underwater vehicle 6 manipulates the next fastening device to be secured to bed 3 at the next stop.

Figure 3:
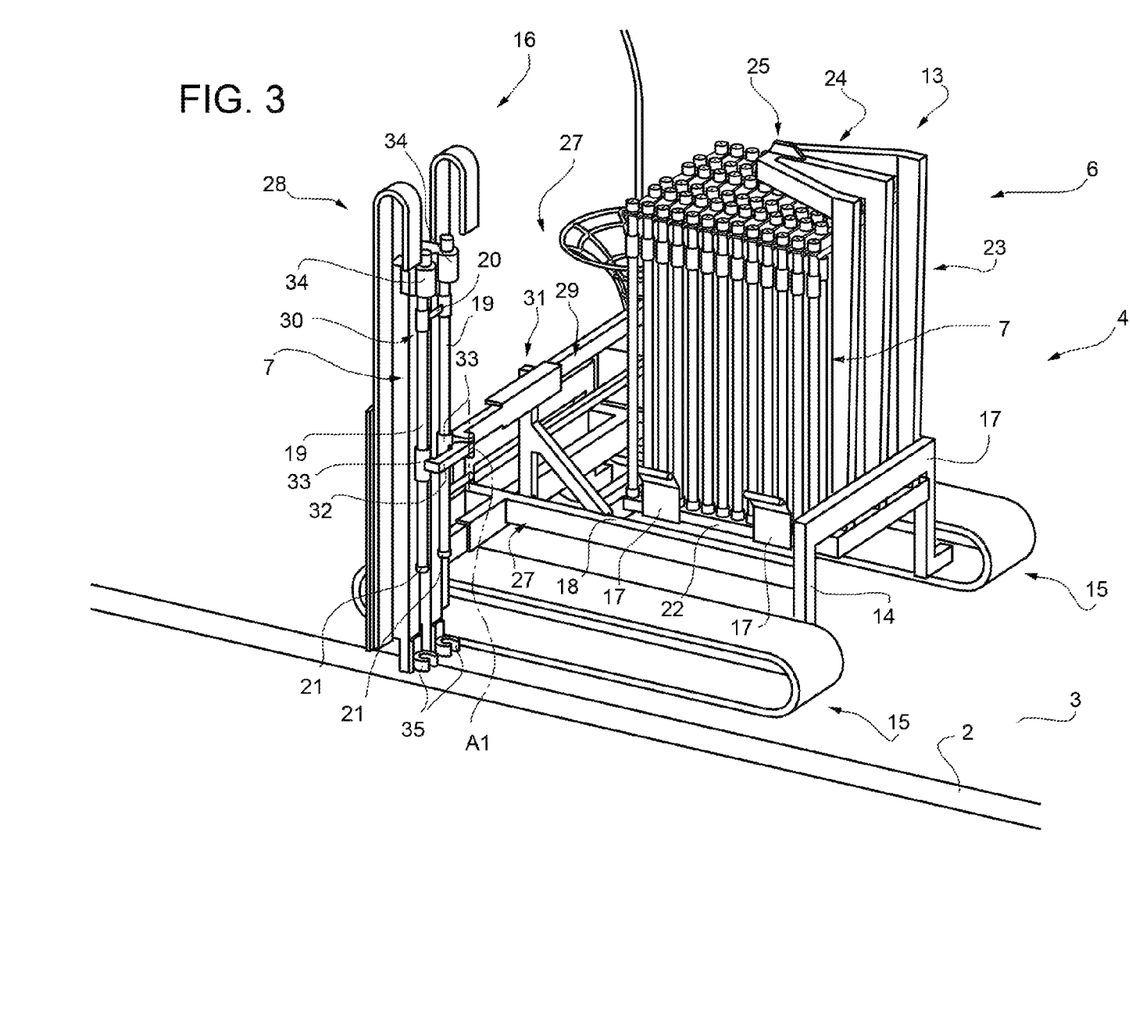
FIG. 3 shows a larger-scale view in perspective, with parts removed for clarity, of part of the FIG. 1 system at a first operating stage.

As shown in FIG. 3, underwater vehicle 6 comprises a supporting frame 14; two powered tracks 15; and a handling device 16 configured to extract fastening devices 7 from module 13 and driving them into bed 3.

Supporting frame 14 supports powered tracks 15, handling device 16, and a module 13. More specifically, supporting frame 14 comprises a module housing area; and locators 17 configured to define the module housing area and guiding module 13 as module is transferred by crane 10 from floating unit 5 to underwater vehicle 6 (FIG. 1).

Supporting frame 14 also comprises two guides 18 extending on opposite sides of the module housing area.

Before going on to describe certain embodiments of handling device 16 in more detail, a detailed description will first be given of certain embodiments of fastening device 7 and module 13.

Each fastening device 7 comprises two hollow poles 19 connected by a saddle 20 and each having a free end 21 facing downwards in use and fitted with a digging head (not shown). In certain embodiments, poles 19 are hollow, so they can be injected with soft cement which, when set, secures poles 19 more firmly to bed 3. Each fastening device 7 is substantially in the form of an inverted U, defined by two parallel poles 19 connected by saddle 20 extending crosswise to poles 19. In actual use, both poles 19 are driven into bed 3, on either side of pipeline 2, so that saddle 20 is positioned close to or on pipeline 2. In one embodiment, saddle 20 is secured to poles 19 to prevent saddle 20 from sliding along poles 19, and to allow or enable poles 19 to rotate about their respective longitudinal axes.

In another embodiment of the disclosure, each pole is fixed to the saddle, and houses a shaft with a digging head on the bottom end.

Figure 4:
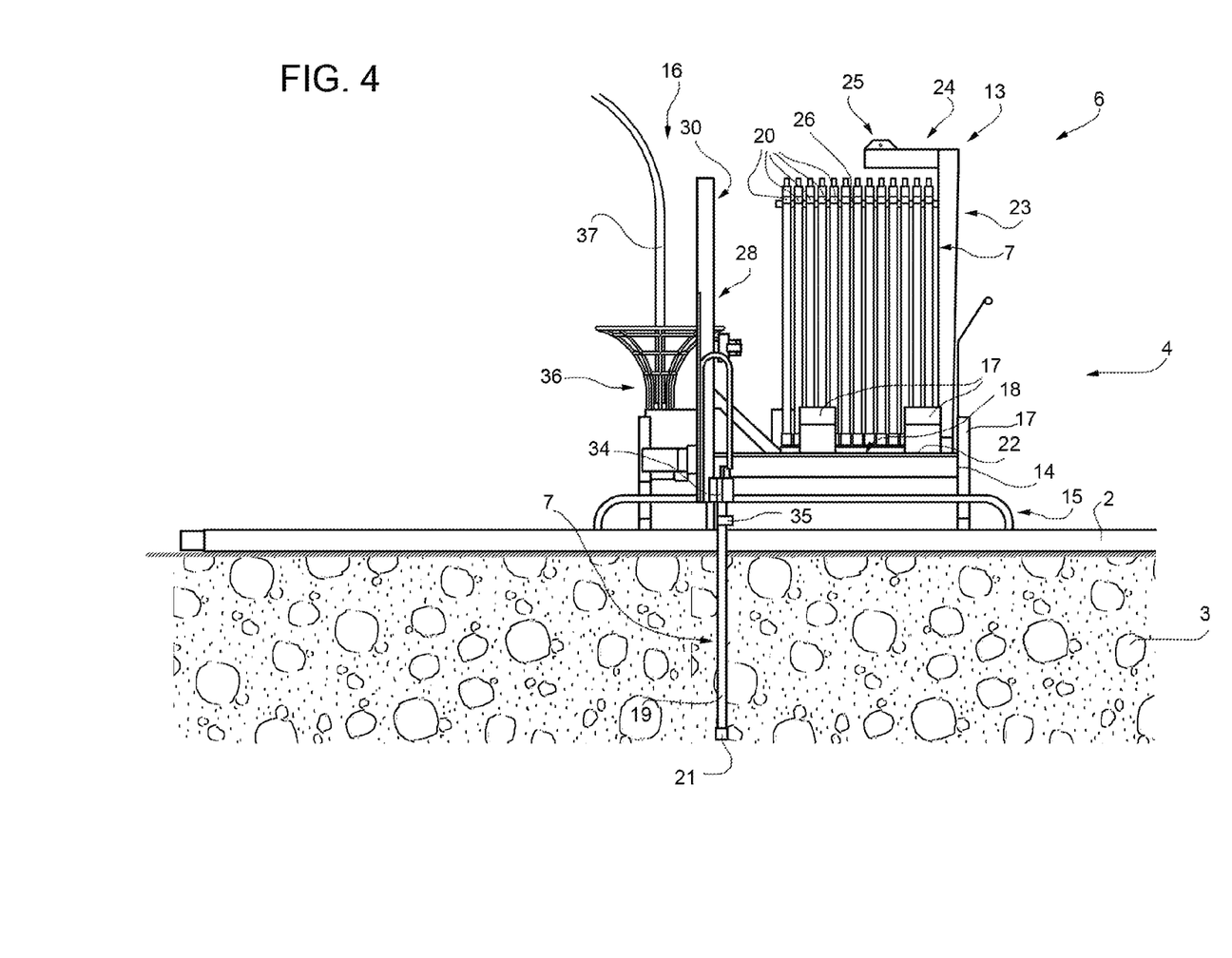
FIG. 4 shows a larger-scale side view, with parts removed for clarity, of operation of part of the FIG. 1 system.

As shown in FIG. 4, each module 13 comprises a base 22; a vertical structure 23 extending from one side of, and integral with, base 22; a top structure 24 integral with vertical structure 23 and comprising a hitch 25; and bars 26 on which to hang fastening devices 7. In the example shown, each module 13 comprises three parallel bars 26 parallel, in use, to guides 18, and along each of which fastening devices 7 are equally spaced. In other words, saddle 20 of each fastening device 7 rests on a bar 26.

As shown in FIG. 3, handling device 16 comprises a slide-like transfer device 27 movable selectively along guides 18; and a driver 28 secured to and extending, in use, alongside supporting frame 14. Transfer device 27 comprises a guide 29 crosswise to guides 18; and driver 28 comprises a substantially vertical guide 30 crosswise to guides 18 and 29. In one embodiment, guide 30 is connected adjustably (e.g., telescopically), to supporting frame 14 to adjust the distance between guide 30 and supporting frame 14, and/or is selectively adjustable about an axis parallel to the longitudinal axis of underwater vehicle 6 to adjust the tilt of guide 30 and therefore the drive-in direction of fastening devices 7. Transfer device 27 also comprises a slide 31 mounted to slide selectively along guide 29, and which comprises a transfer assembly 32 mounted to rotate about an axis A1 with respect to the base of slide 31; and two grippers 33, each fitted to transfer assembly 32 and configured to grip two poles 19 of the same fastening device 7. In other words, guides 18 and 29 serve to move grippers 33 with respect to module 13, and to position grippers 33 to engage all the fastening devices inside module 13. Transfer assembly 32 is configured to turn grippers 33 about the substantially vertical axis A1 into a position facing guide 30 of driver 28.

Driver 28 also comprises two driving members 34 mounted to slide along guide 30; and two guides 35 fixed to the bottom of guide 30 to guide poles 19 as they are driven in. Each driving member 34 is configured to grip the saddle 20 end of pole 19 and rotate pole 19 about its longitudinal axis, or to rotate the internal shaft connected to the digging head.

As shown in FIG. 4, underwater vehicle 6 has a device 36 configured to connect an umbilical 37 connected to floating unit 5 (FIG. 1) to supply underwater vehicle 6 with electric, pneumatic or hydraulic energy by which to power tracks 15 and various actuators (not shown) configured to operate handling device 16.

Figure 5:
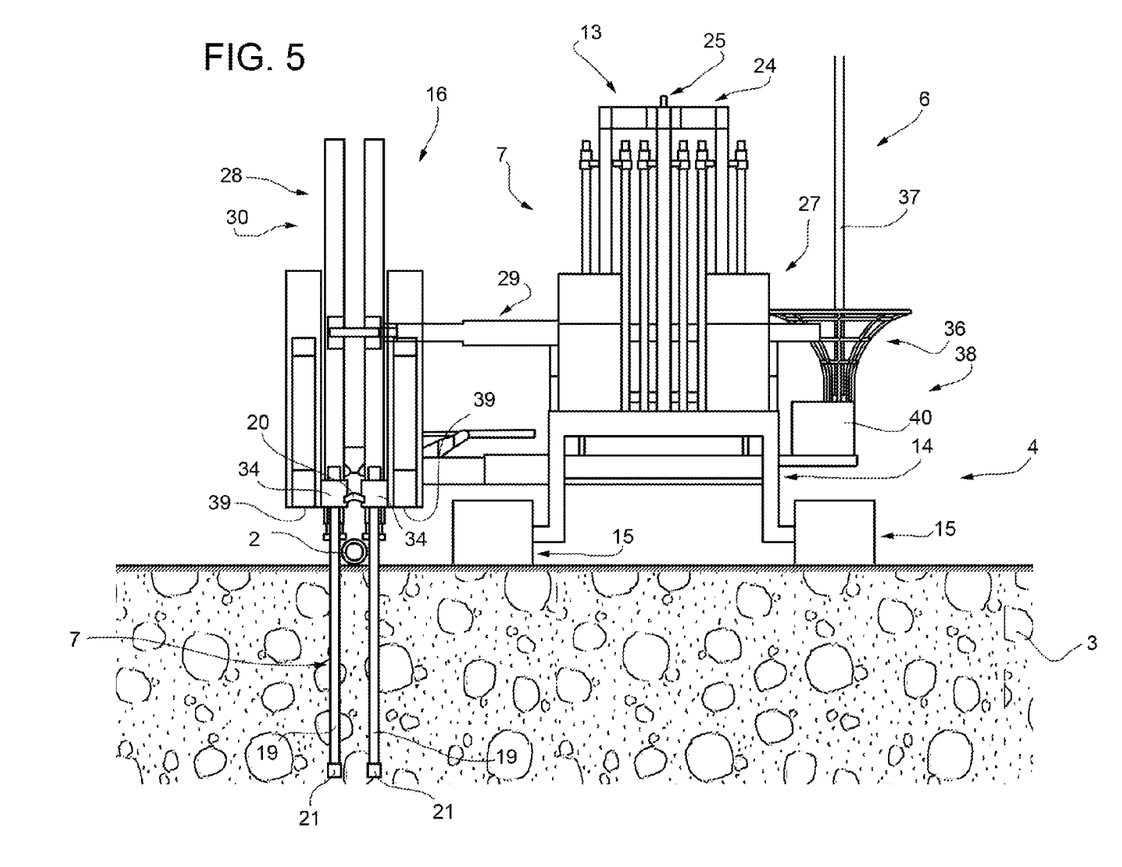
FIG. 5 shows a front view, with parts removed for clarity, of the FIG. 4 part of the system.

In certain embodiments, underwater vehicle 6 is remote-controlled, so accordingly comprises an automatic control device 38 comprising sensors 39 and a control unit 40 configured to operate powered tracks 15 and handling device 16 as shown schematically in FIG. 5. In the example shown, handling device 16, in particular guide 30, is fitted at the bottom end with sensors 39 configured to emit signals related to the distance between underwater vehicle 6 and pipeline 2. Control unit 40 determines the correct position of handling device 16 (i.e., of guide 30), with respect to pipeline 2 on the basis of these signals, and corrects the position of underwater vehicle 6 when any deviation from the optimum position is detected. When the position of handling device 16 deviates from the optimum position by more than a designated or given threshold value, control unit 40 disables drive-in of fastening devices 7, to avoid damaging pipeline 2.

In actual use, underwater vehicle 6 is moved along pipeline 2, on bed 3. When the vehicle stops, handling device 16 drives a fastening device 7 into bed 3, astride pipeline 2, as shown in FIG. 5. As the vehicle moves forward, handling device 16 transfers another fastening device 7 and positions the other fastening device 7 along guide 30, ready to be driven in as soon as underwater vehicle 6 comes to a stop, as shown in FIG. 3. As shown in FIG. 1, when all the fastening devices 7 are unloaded from module 13, crane 10 hoists the empty module 13 off underwater vehicle 6 and onto floating unit 5, and transfers another fully loaded module 13 onto underwater vehicle 6.

The synergies and multitasking provided for by the method described enable the pipeline to be secured faster, with less skilled labour, and therefore much more cheaply as compared with known methods.

Clearly, changes may be made to the embodiments described of the present disclosure without, however, departing from the protective scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of securing a pipeline to a bed of a body of water, the method comprising:
    selectively moving an underwater vehicle on the bed of the body of water along the pipeline, wherein a handling device is mounted on the underwater vehicle;
    setting a module in a predetermined position on the underwater vehicle, wherein said underwater vehicle is configured to support the module, said module stores a plurality of fastening devices, and prior to being driven into the bed of the body of water, each fastening device includes at least two poles connected by a saddle;
    transporting at least one of fastening devices from the module to the handling device; and
    causing the handling device to drive each transported fastening device partly into the bed of the body of water by digging into the bed of the body of water using a bottom end of each of the poles of said transported fastening device and simultaneously driving the poles into the bed of the body of water to confine the pipeline between the bed of the body of water and at least the saddle of said transported fastening device.

2. The method of claim 1, wherein digging into the bed of the body of water includes rotating at least the bottom ends of the poles.

3. The method of claim 1, wherein driving the poles into the bed of the body of water includes imparting a reciprocating movement to the poles, along a longitudinal axis of at least one of the poles, to hammer the poles into the bed of the body of water.

4. The method of claim 1, which includes using the handling device and a plurality of sensors mounted on the underwater vehicle to position each transported fastening device astride the pipeline.

5. The method of claim 4, wherein the plurality of sensors are mounted on the handling device.

6. The method of claim 1, which includes causing the handling device to extract each fastening device from the module and position the extracted fastening device over the pipeline.

7. The method of claim 6, which includes causing a plurality of grippers on the handling device to remove each fastening device from the module and transferring the removed fastening device to at least one driving member on the handling device.

8. The method of claim 6, which includes:
    transferring an empty module from the underwater vehicle to a floating support unit of the underwater vehicle, and
    transferring a full module of fastening devices from the floating support unit to the underwater vehicle.

9. The method of claim 1, which includes remote-controlling the underwater vehicle.

10. The method of claim 9, which includes remote controlling the underwater vehicle from a floating support unit of the underwater vehicle.

11. The method of claim 1, wherein each fastening device is substantially inverted-U-shaped.

12. A pipeline securing system comprising:
    an underwater vehicle configured to move in steps on a bed of a body of water along a pipeline, said underwater vehicle including:
        at least one module configured to store a plurality of fastening devices, each fastening device includes at least one pole and a saddle connected to the at least one pole, and
        a supporting frame with a predefined area configured to support said at least one module; and
    a handling device mounted to slide along the supporting frame of the underwater vehicle to extract each fastening device from the at least one module mounted, said handling device including a plurality of grippers movable along a plurality of different axes to grip each fastening device in the at least one module and transfer the gripped fastening device to at least one driving member of the handling device, said at least one driving member configured to, for each fastening device, rotate at least a bottom end of the at least one pole of said fastening device to dig into the bed of the body of water and drive said fastening device partly into the bed of the body of water to confine the pipeline between the bed of the body of water and said fastening device.

13. The pipeline securing system of claim 12, wherein the at least one driving member is mounted to slide along a guide to drive the at least one pole of said fastening device partly into the bed of the body of water.

14. The pipeline securing system of claim 12, wherein the underwater vehicle includes:
    a plurality of sensors which emit a plurality of signals related to a position of the pipeline with respect to the underwater vehicle; and a control device configured to cause the handling device to position each fastening device astride the pipeline as a function of the plurality of signals emitted by the plurality of sensors.

15. The pipeline securing system of claim 12, which includes a floating unit configured to remotely control operation of the underwater vehicle.

16. The pipeline securing system of claim 12, wherein the underwater vehicle includes two powered tracks which cause the underwater vehicle to move on the bed of the body of water.

17. A method of securing a pipeline to a bed of a body of water, the method comprising:
    selectively moving an underwater vehicle on the bed of the body of water along the pipeline, wherein a handling device is mounted on the underwater vehicle;
    setting a module in a predetermined position on the underwater vehicle, wherein said underwater vehicle is configured to support the module, said module stores a plurality of fastening devices, and each fastening device includes at least one pole and a saddle connected to the at least one pole;
    moving a plurality of grippers along a plurality of different axes to grip at least one of the fastening devices in the module;
    transporting the at least one gripped fastening device from the module to the handling device; and
    causing the handling device to drive each transported fastening device partly into the bed of the body of water by digging into the bed of the body of water using a bottom end of the at least one pole of said transported fastening device and simultaneously driving the at least one pole into the bed of the body of water to confine the pipeline between the bed of the body of water and said transported fastening device.

18. The method of claim 17, wherein digging into the bed of the body of water includes rotating at least the bottom end of the at least one pole.

19. The method of claim 17, wherein driving the at least one pole into the bed of the body of water includes imparting a reciprocating movement to the at least one pole, along a longitudinal axis of the at least one pole, to hammer the at least one pole into the bed of the body of water.

20. The method of claim 17, which includes using the handling device and a plurality of sensors mounted on the underwater vehicle to position each transported fastening device astride the pipeline.

21. The method of claim 20, wherein the plurality of sensors are mounted on the handling device.

22. The method of claim 17, which includes remote-controlling the underwater vehicle.

23. The method of claim 22, which includes remote controlling the underwater vehicle from a floating support unit of the underwater vehicle.

24. The method of claim 17, which includes causing the handling device to extract each fastening device from the module and position the extracted fastening device over the pipeline.

\* \* \* \* \*